United States Patent
Seymour

(10) Patent No.: US 7,021,246 B2
(45) Date of Patent: Apr. 4, 2006

(54) ANIMAL UMBRELLA

(76) Inventor: Lou H. Seymour, 67 Knollsbrook Drive, Nepean, Ontario (CA) K2J 1K9

(*) Notice: Subject to any disclaimer, the term of this patent is extended or adjusted under 35 U.S.C. 154(b) by 0 days.

(21) Appl. No.: 10/751,533

(22) Filed: Jan. 6, 2004

(65) Prior Publication Data

US 2004/0134447 A1    Jul. 15, 2004

(30) Foreign Application Priority Data

Jan. 6, 2003    (CA)  .................... 2414679

(51) Int. Cl.
*A01K 29/00*    (2006.01)
(52) U.S. Cl. ...................................... 119/850
(58) Field of Classification Search ............... 119/796, 119/850
See application file for complete search history.

(56) References Cited

U.S. PATENT DOCUMENTS

| | | |
|---|---|---|
| 3,999,521 A | 12/1976 | Puiello |
| 4,537,339 A | 8/1985 | Pearson |
| D324,117 S | 2/1992 | Antoine |
| 5,184,762 A | 2/1993 | Nevitt |
| 5,199,383 A | 4/1993 | Lagana |
| 5,546,970 A * | 8/1996 | Amato ........................ 135/16 |
| D391,392 S | 3/1998 | Adams |
| 5,746,158 A | 5/1998 | Landherr |
| 5,911,399 A * | 6/1999 | Mannion .................... 248/514 |
| 5,918,611 A * | 7/1999 | Amato ........................ 135/16 |
| 6,105,594 A * | 8/2000 | Diaz ........................... 135/16 |
| 6,374,840 B1 * | 4/2002 | Ma ............................. 135/22 |
| 6,539,898 B1 * | 4/2003 | Gatto ......................... 119/850 |
| 6,571,745 B1 | 6/2003 | Kerrigan |
| 6,619,834 B1 * | 9/2003 | Krader et al. ............. 366/162.5 |
| 6,732,834 B1 * | 5/2004 | Colorado ..................... 182/6 |
| 6,877,702 B1 * | 4/2005 | Diggle et al. ............. 248/278.1 |

* cited by examiner

*Primary Examiner*—Thomas Price
(74) *Attorney, Agent, or Firm*—Gail C. Silver; Borden Ladner Gervais LLP

(57) ABSTRACT

An animal umbrella is disclosed. The animal umbrella comprises a saddle, straps connected to the saddle for detachably attaching the saddle to the animal, a collapsible canopy, a shaft with first and second ends, connected at the first end to the canopy, and connected at the second end to the saddle in a pivotable manner, and a position lock to releasably secure the shaft in a vertical position. The shaft can be pivoted between a substantially vertical position and a substantially horizontal position, so that in a vertical position the canopy is open and held vertically, and in a horizontal position the canopy is closed and lies horizontally along the animal's back.

12 Claims, 5 Drawing Sheets

ANIMAL UMBRELLA

FIELD OF THE INVENTION

The present invention relates generally to umbrellas. More particularly, the present invention relates to an umbrella which can be harnessed to an animal, such as a dog or other pet.

BACKGROUND OF THE INVENTION

Many pet owners go to great lengths to offer care and protection for their animals normally reserved for humans. For instance when taking the pet out for a walk, protection is needed from rain, snow, or sun exposure. Often, a pet walker is required to share his or her umbrella with the pet. This can be impractical for the pet walker and inefficient for the protection of both human and pet from rain considering that many pets curiously stray from the walking path. Holding a second umbrella over the pet while still holding on to one's own umbrella and a pet leash can be an awkward and unpleasant experience. There is a need, therefore, for an umbrella that can be used specifically by the pet.

Umbrellas and similar devices for protecting dogs and other pets from environmental elements have been described.

U.S. Design Pat. No. 324,117 (Feb. 18, 1992), issued to Antoine, discloses a dog umbrella design having a harness in the shape of a cylinder which wraps around the body of the dog. The umbrella is attached to the top of the harness. The umbrella includes a clear sheet which extends over the dog and drapes down around the entire body of the dog toward the ground. Air holes are present in the clear sheet to facilitate breathing. The harness of this umbrella can easily slip as the dog moves such that the umbrella falls down to the side of the animal, unless the harness is made very tight which would be quite uncomfortable for the dog. Furthermore, having the pet enveloped in a clear sheet, such as plastic, could prove quite hot for the animal.

U.S. Design Pat. No. 391,392 (Mar. 3, 1998), issued to Adams, discloses a pet umbrella design featuring a planar sheet which is held over a pet through a neck strap and a body strap. In this design, the animal's head is only partly covered, which is not desirable. Further, the front part of the sheet would apparently rest on the head of the animal, and the animal's head movements would be constrained, which would be uncomfortable. Furthermore, the flat design of the sheet could result in the accumulation of water on the sheet.

U.S. Pat. No. 5,546,970 (Aug. 20, 1996), issued to Amato, discloses an animal umbrella comprising a saddle and a detachable umbrella. The saddle is strapped to a conventional harness and to the animal's collar. The umbrella portion is composed of a shank and a rigid canopy. The shank is detachably connected at its lower end to the saddle by snapping the lower end of the shank into a hole of the appropriate cross-section in the saddle. At its upper end, the shank is detachably connected to the rigid canopy. The rigid canopy cannot be folded, which makes it inconvenient to store or carry the umbrella when not in use. Further, the canopy is made of hard plastic material which can be heavy for the average pet.

U.S. Pat. No. 5,918,611 (Jul. 6, 1999), also issued to Amato, discloses an animal umbrella comprising a saddle and a detachable umbrella. In this case, the umbrella is composed of a shank and a foldable canopy. The foldable canopy makes it more convenient to store or carry the umbrella; however, this umbrella suffers from the disadvantage that the dismounted folded canopy must be carried by the animal owner. In an alternative embodiment, additional canopy storing straps are described which provide a means for attaching the folded umbrella to the side of the animal. However, such straps are attached to the conventional harness; thus, the owner must sew the straps to the conventional harness or purchase a special non-conventional dog harness having the additional straps. This makes the means of attaching the folded canopy to the animal inconvenient.

Furthermore, both umbrellas described by Amato suffer from the disadvantage that the saddle must be attached to a conventional dog harness, which the animal owner may not already possess. This is particularly inconvenient when a dog owner does not own a harness but wants to protect the dog from the elements. In addition, the umbrella must be attached and detached from the saddle between uses, which is inconvenient, especially as additional time is required to attach the umbrella to the saddle and also may require greater manual dexterity. These disadvantages would be especially apparent in a sudden downpour, or by an owner who is not particularly dexterous (for example, an owner with arthritis).

SUMMARY OF THE INVENTION

It is an object of the present invention to obviate or mitigate at least one disadvantage of previous animal umbrellas.

According to one aspect of the invention there is provided an umbrella for an animal comprising a saddle; straps connected to the saddle for detachably attaching the saddle to the animal; a collapsible canopy; a shaft with first and second ends, connected at the first end to the canopy, and connected at the second end to the saddle in a pivotable manner, wherein the shaft can be pivoted at the second end between a substantially vertical position and a substantially horizontal position; and a position lock to releasably secure the shaft in the said vertical position. In an open position, the position lock is engaged, the shaft is held substantially vertical and the canopy is open, and in a closed position, the position lock is disengaged, the shaft is substantially horizontal and the canopy is collapsed.

Furthermore, the animal umbrella of the present invention is self-supporting as it does not require an animal harness to be wearable and operable.

In one embodiment, there is provided a rectangular collapsible umbrella canopy which protects the body length of the animal.

In a further aspect, the present invention provides animal umbrellas of different sizes to accommodate different sized animals. Because of this flexibility, the animal umbrella can be used with any quadrupedal animal, typically with dogs.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached figures, wherein.

DETAILED DESCRIPTION

Generally, the present invention provides an animal umbrella. Specifically, the invention provides an umbrella for an animal comprising a saddle; straps connected to the saddle for detachably attaching the saddle to the animal; a collapsible canopy; a shaft with first and second ends, connected at the first end to the canopy, and connected at the second end to the saddle in a pivotable manner, wherein the shaft can be pivoted at the second end between a substantially vertical position and a substantially horizontal position; and a position lock to releasably secure the shaft in the said vertical position. In an open position, the position lock is engaged, the shaft is held substantially vertical and the canopy is open, and in a closed position the position lock is disengaged, the shaft is substantially horizontal and the canopy is collapsed.

Typically, the present invention is used with dogs, but can be used with most pets, such as cats, horses, pigs and similar quadrupedal animals. The animal umbrella of the present invention can be used to shield the dog from rain, sunlight or any other unwanted precipitation or environmental condition.

The animal umbrella of the present invention can comprise any collapsible canopy and shaft. The shaft can be made of any sturdy material, such as aluminum or plastic. In one embodiment, the collapsible canopy is rectangular so as to cover the entire length of the animal, although a standard, round collapsible canopy can also be used. One advantage of a rectangular collapsible canopy is the ease with which an animal wearing the animal umbrella of the present invention can closely approach a fixed object, such as a wall or tree, without having the collapsible canopy banging up against the object. The animal can explore the surroundings, urinate or defecate in a relatively unhindered fashion.

The present invention represents a technological advancement in the art of animal umbrellas. One advantage of the present invention is that no animal harness is required. The saddle can be attached directly to the back of the animal. A further advantage of the present invention is that the shaft and canopy do not need to be removed from the folded canopy holder when the umbrella is not being used. A folded canopy holder may be present at the distal end of the saddle to hold the shaft and canopy when the canopy is closed and when the shaft is in the substantially horizontal position. Optionally, the shaft and canopy can be removed. Once removed, it is possible to replace the shaft and canopy with an alternate shaft and canopy as needed (such as, for example, when the canopy or shaft becomes damaged or when the umbrella is being used on a different sized animal).

Figure 1:
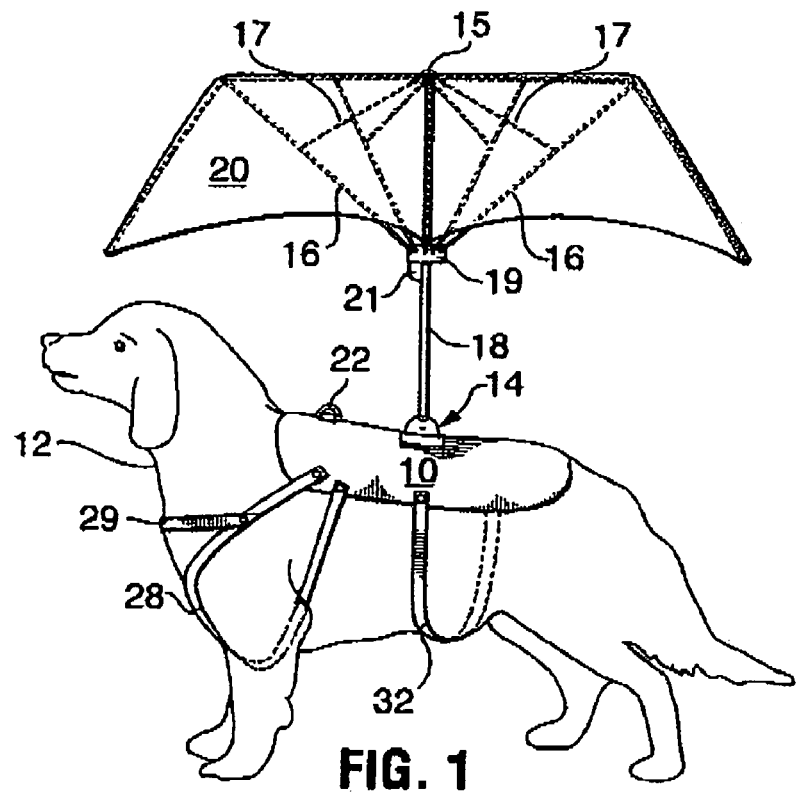
FIG. 1 illustrates the umbrella according to one aspect of the present invention as worn by a dog.

Referring to FIG. 1, an umbrella in accordance with one aspect of the invention is shown, as worn by a dog. The saddle 10 is placed on the back of the dog 12. The saddle 10 is attached to the dog 12 using two foreleg straps 28 encircling the forelegs, a chest strap 29 (connected to the foreleg straps 28) around the front part of the dog's body, and a torso strap 32 that encircles the torso of the dog 12.

A shaft 18 having a collapsible canopy 20 at one end (a first end) is pivotally attached to the saddle 10 at its other end (the second end). The shaft 18 can be adjustable in length. The canopy 20 is attached to the first end of the shaft with a canopy cap 15 at a central location on the canopy 20. A plurality of canopy ribs 17 extend radially from the cap 15 to points at the edge of the canopy 20. Support ribs 16 extend from these points to a slider 19 which moveably encircles the shaft 18. A slider stopper 21 is situated near the first end of the shaft 18 below the cap 15. The slide stopper 21 extends outward from the shaft. The slide stopper 21 is spring loaded so that it can be pushed into the shaft 18; and when released, the slide stopper 21 assumes the position it had prior to being pushed into the shaft 18. From a closed position, the canopy 20 is opened by sliding the slider 19 up the shaft past the slider stopper 21 and the slider stopper 21 prevents the slider 19 from sliding back down the shaft 18. In the open position, the canopy 20 is substantially opened and the slider 19 rests on the slider stopper 21. To close the canopy 20, the slider stopper 21 is pushed into the shaft 18 so that the slider 19 is no longer impeded and can freely travel down the shaft. As the slider 19 passes down the shaft 18, the canopy 20 closes. In the closed position, the slider 19 is substantially near the second end of the shaft 18.

In one embodiment of the present invention, a leash-receiving ring 22 is mounted on the surface of the saddle 10. The leash-receiving ring 22 allows the human user to attach the dog's leash to the saddle 10 without the use of a collar. Typically, the leash receiving ring 22 is to be attached to the front end of the saddle 10, near the animal's head.

Figure 2:
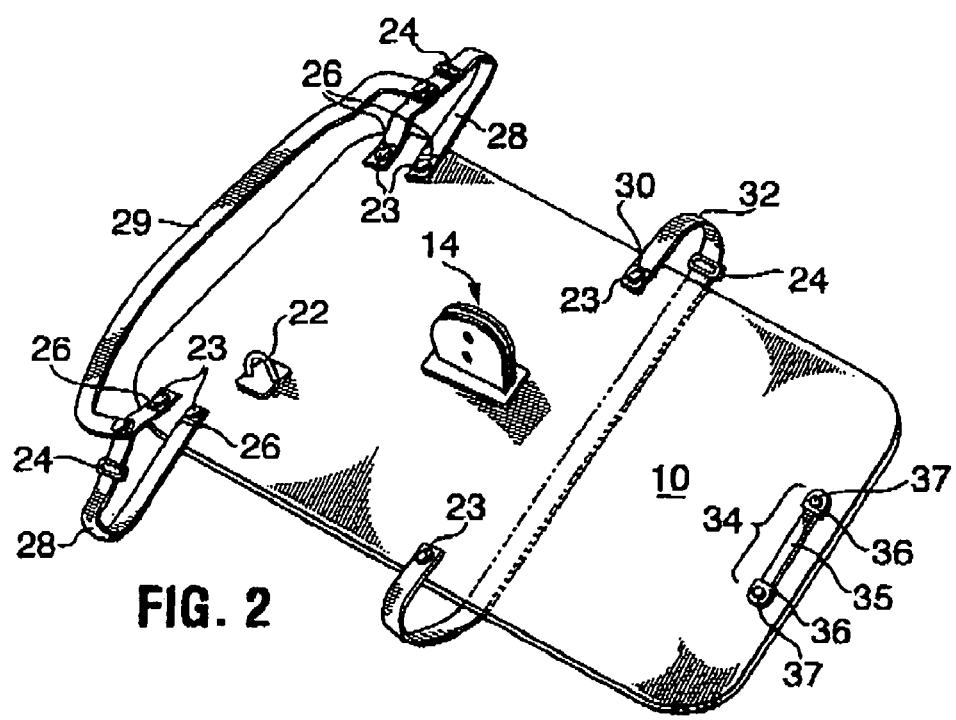
FIG. 2 is a top view of the saddle according to one aspect of the present invention.

FIG. 2 is a top view of the saddle of FIG. 1. The saddle 10 is typically made of leather or any durable, lightweight material. Embodiments of the saddle 10 come in a selection of sizes to accommodate most breeds of dog. The leg, chest, and torso straps (28, 29, 32) which hold the saddle 10 to the animal can be made of any sturdy material, such as leather, nylon, vinyl or plastic. The leg and torso straps 28, 32 are attached to the saddle using strap attachments. In one embodiment, the straps are secured to the saddle using snap buttons 23 on the ends of the straps 28, 32 and at locations on the surface of the saddle 10 which will be defined herein. Optionally, hook and pile fabric or buckle attachments can be used instead of snaps. Optionally, the length of the leg, chest, and torso straps 28, 29, 32 can be adjusted to suit the physical dimensions of the dog. A strap loop 24 situated on each support strap allows for the extension of the strap to accommodate larger or smaller dogs. Each leg and torso strap 28, 32 is attached to the saddle at points located in proximity to the anatomical loci which are to be supported. Thus, in one embodiment, two foreleg strap attachments 26 are located at each corner of the saddle 10 for attaching each of the four foreleg straps 28 and one torso strap attachment 30 is located near the middle of each of the side edges of the saddle 10 for attaching a torso strap 32.

The number and the position of the straps can be varied to obtain variety of fits. For instance, four leg straps 28 can be used, one for each leg, rather than two. In one embodiment of the present invention, there are five support straps: one support strap for each of the dog's legs and one for the dog's torso.

A folded canopy holder 34 is situated at the distal end of the saddle 10 for holding down the shaft 18 and canopy 20 when not in use. The folded canopy holder 34 comprises a storage strap 35 and folded canopy holder buckles 36. The storage strap 35 comprises first and second ends which are each attached to a folded canopy holder buckle 36. The buckles 36 are reversibly attachable to the saddle 10 using folded canopy holder attachments 37. The attachments 37 are typically snap buttons, similar to what is used to attach the other straps 28, 32 defined above to the saddle 10, although any other suitable attachment means can be used.

Figure 3:
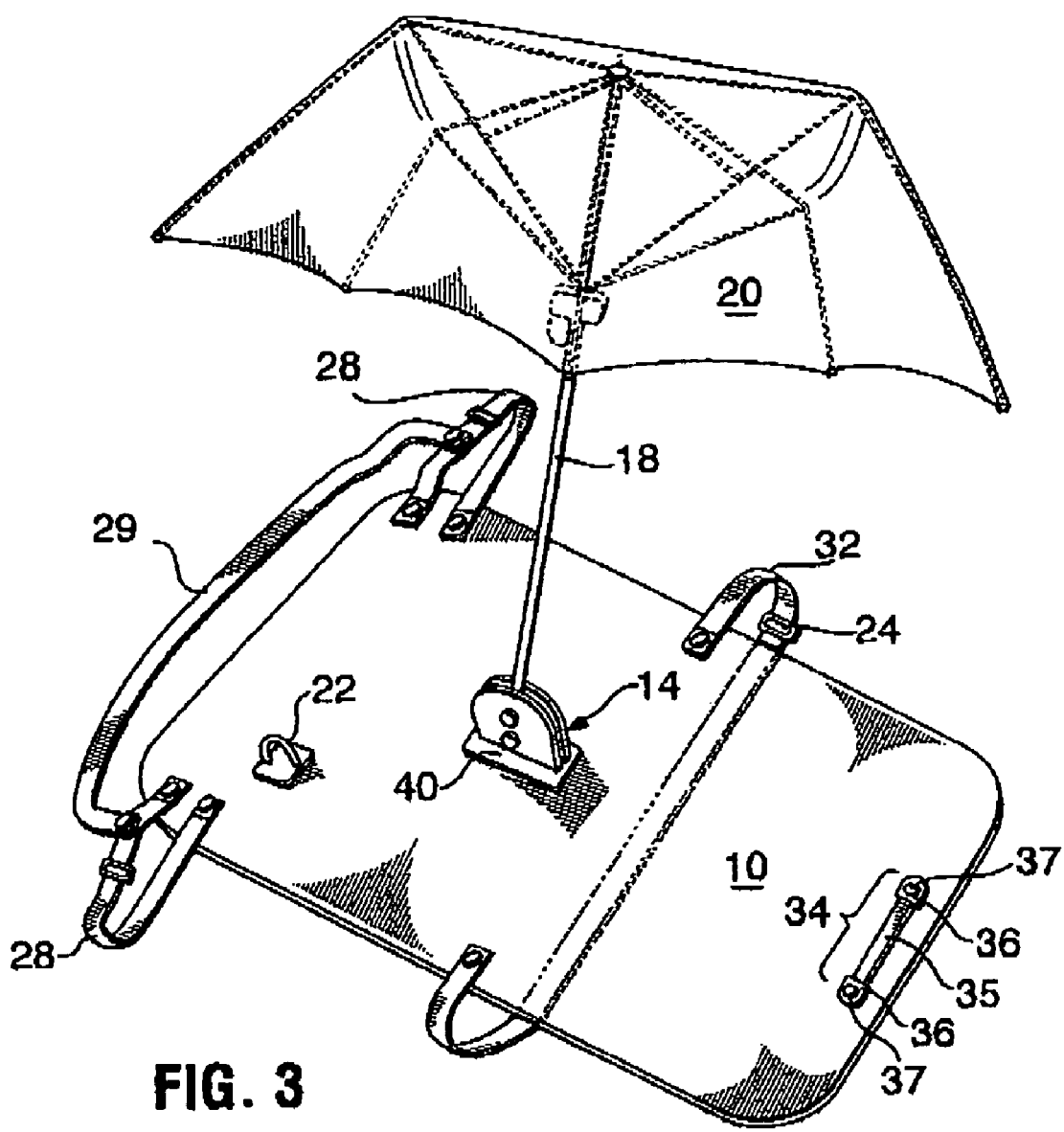
FIG. 3 shows one embodiment of the saddle with a shaft and canopy attached to it.

FIG. 3 shows one embodiment of the saddle with a shaft and canopy attached to it. As stated previously, the shaft 18 is pivotally attached to the saddle 10 by attaching a first end of the shaft 18 to a collapsible canopy 20 and a second end of the shaft 18 to a connector 14. Typically, the shaft 18 and the canopy 20 comprise lightweight materials so that they can be easily supported by the dog without causing excessive discomfort. The shaft is typically made of a light metal such as aluminum so that it is lightweight while still maintaining a rigid structure that will not be damaged by high winds. The canopy can be made of plastic, nylon or vinyl.

Figure 4:
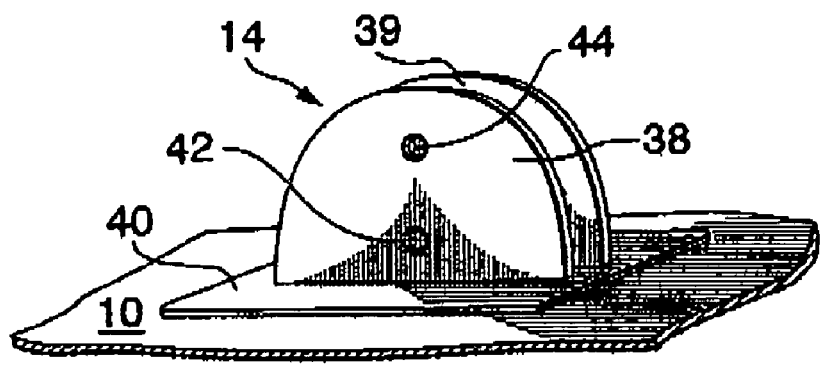
FIG. 4 shows detail of a shaft connector in one aspect of the present invention.

FIG. 4 shows detail of one embodiment of a shaft connector 14. In one embodiment of the present invention the connector 14 comprises a plate 40 secured to the saddle 10 and first and second mutually substantially parallel planar members 38, 39 secured substantially perpendicularly to the plate 40. Each planar member 38, 39 is typically made of metal and contains a first hole 42 and a second hole 44 through it. The holes are situated on the face of each planar member such that the holes are substantially vertical to each other on each planar member.

Figure 5:
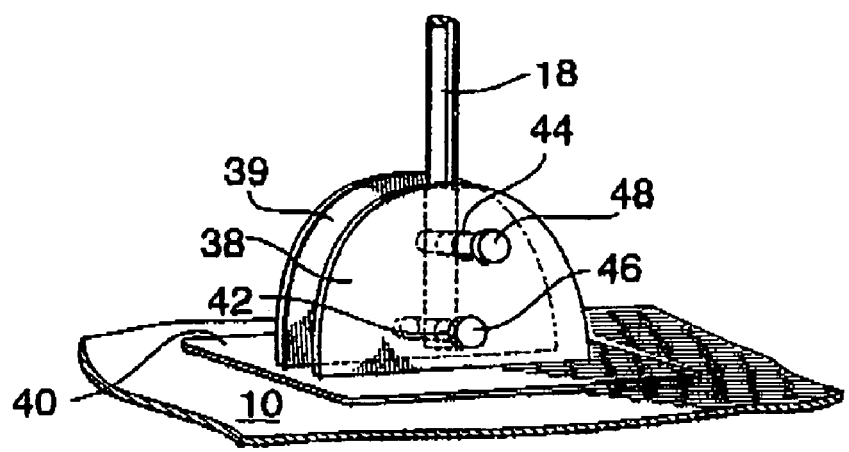
FIGS. 5 and 5A illustrate how the shaft is attached to the connector in at least two respective aspects of the present invention.
Figure 5A:
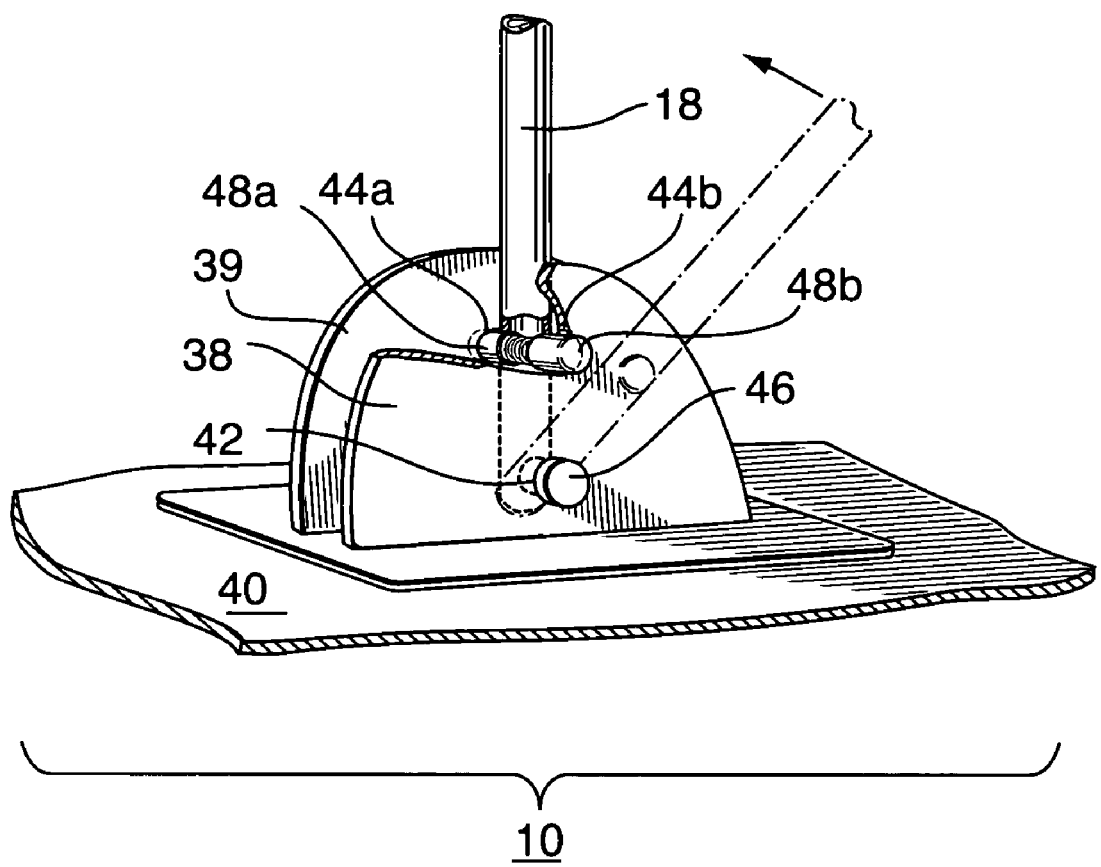

In a typical embodiment illustrated in FIG. 5, first and second shaft holes are located substantially at the second end of the shaft 18 and are substantially vertical to each other when the shaft 18 is in the vertical position. A first pin 46, typically of a length slightly greater than the width of the space between the two planar members, passes through the first hole 42 in the first planar member 38, through the first shaft hole, and through the second planar member 39 to secure the shaft pivotally to the saddle 10. A second pin 48 passes through the second hole 44 in the first planar member 38, through the second shaft hole, and through the second planar member 39 to secure the shaft in the substantially vertical position. It is in this position that the canopy is typically opened for use. To move the shaft 18 and canopy 20 into a horizontal position, the second pin 48 is released from its engagement with the two planar members 38 and 39, allowing the shaft 18 to be pivoted downward. As shown in FIG. 5A, the second pin 48a and 48b can contain a resilient biasing means (not shown) to allow its two ends to be compressed inwardly to release the second pin 48a and 48b from the holes in the planar members 38 and 39. Alternatively, other means can be used to allow the second pin 48 to be releasably engaged with the planar members 38 and 39. The combination of the second pin 48 with the upper holes in the two planar members 38 and 39 constitutes one embodiment of a position lock.

Figure 6:
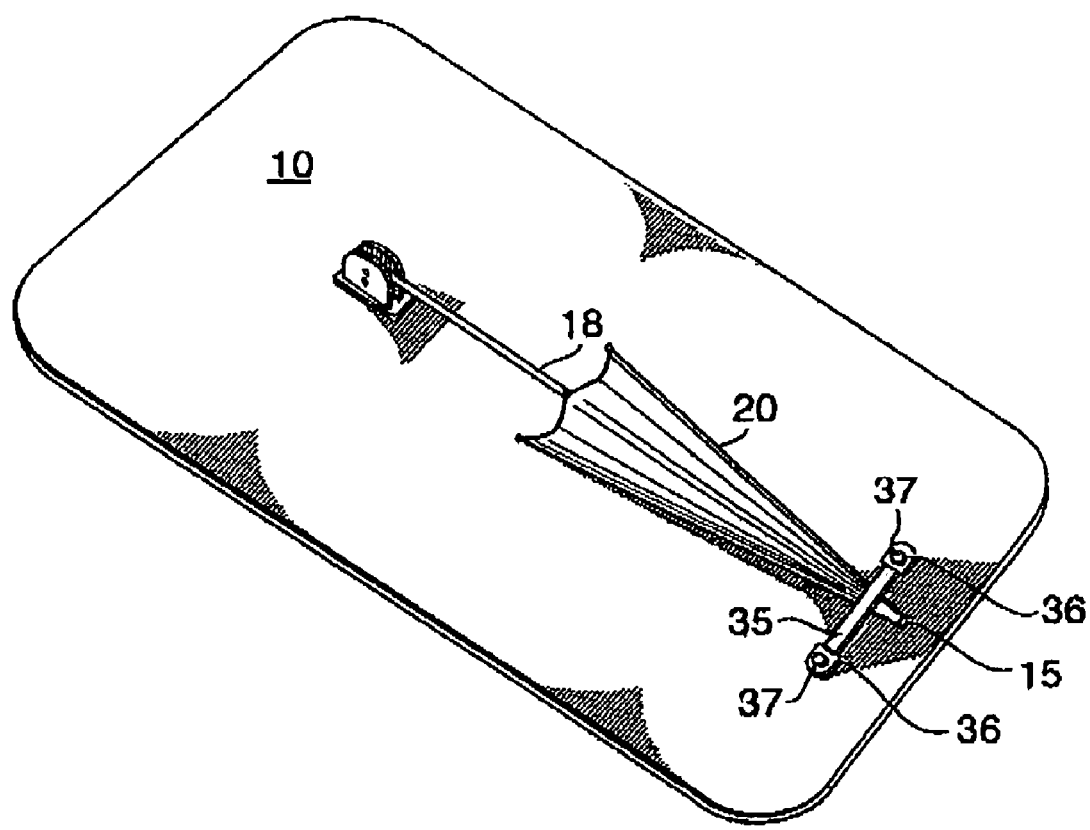
FIG. 6 illustrates the canopy in the closed position stored with a folded canopy holder on the surface of the saddle in one embodiment of the present invention.

FIG. 6 illustrates the canopy 20 in the closed position stored on the surface of the saddle of the present invention. The shaft 18 and canopy 20 in the closed position are pivoted to a substantially horizontal position, such that the exterior face of the canopy cap 15 points to the distal end of the saddle 10. One of the folded canopy holder buckles 36 is detached from the folded canopy holder attachment 37 and the shaft 18 and canopy 20 are placed underneath the storage strap 35. The buckle 36 is then reattached to the attachment 37, holding the shaft 18 and canopy 20 in place.

Figure 7:
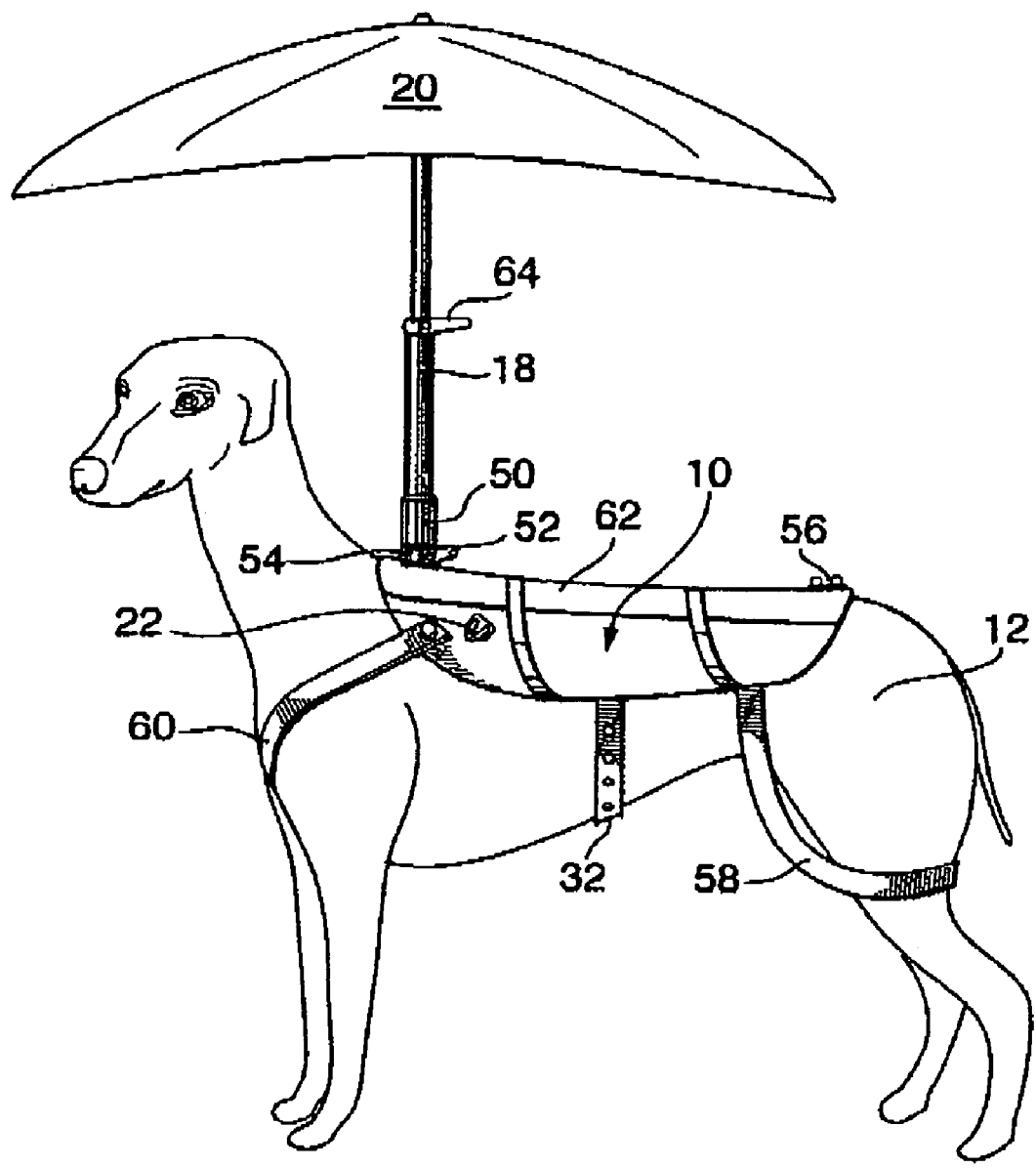
FIG. 7 illustrates a further embodiment of one aspect of the present invention with the shaft attached to the saddle using a tube and fastener.

In an alternate embodiment shown in FIG. 7, the connector comprises a tube 50 attached to the saddle 10 for receiving the second end of the shaft 18, and a fastener 52 comprising a ring 54 which encircles the tube. The fastener 52, when engaged, tightens the ring 54 and secures the shaft 18. The shaft 18 is held in an extended position with a clip 64. The clip 64 can be released and then re-engaged to move the shaft 18 such that canopy 20 can be placed in a higher or lower position. In the horizontal position, the shaft 18 and canopy 20 are secured to the saddle 10 using a clip lock 56. In the embodiment shown, the saddle 10 comprises five animal straps: two front support straps 60, a torso strap 32 and two hind leg straps 58. A sheet of metal 62 extends along the centre of the saddle 10 to provide further stability and help the saddle 10 sit securely on the dog 12.

It will be understood by those skilled in the art that numerous methods for connecting the shaft 18 to the saddle 10 in a pivotal manner can be envisaged, and the invention is not limited by the specific examples described herein.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. An umbrella for an animal comprising:
   a saddle;
   straps connected to the saddle for attaching the saddle to the animal;
   a collapsible canopy;
   a shaft with first and second ends, the first end connected to the collapsible canopy;
   a pivot pin connected to the saddle for attaching the second end of the shaft to the saddle defining an axis of rotation about which the shaft rotates between a substantially vertical and a substantially horizontal position relative to the saddle whicle the shaft is attached to the saddle; and
   a position lock having two ends, the position lock releasably securing the shaft in the vertical position when the shaft is attached to the saddle, the position lock including a resilient biasing means for allowing the two ends of the position lock to be compressed inwardly in order to release the position lock from securing the shaft ion the vertical position.

2. The umbrella of claim 1, further comprising a folded canopy holder for securing the folded canopy to the saddle while the shaft is attached to the saddle at the second end and while the shaft is in the substantially horizontal position relative to the saddle.

3. The umbrella of claim 2, wherein the folded canopy holder comprises a strap attached to an end of the saddle distal to the animal's head, which strap passes over the folded canopy when the canopy is in the horizontal position relative to the saddle.

4. The umbrella of claim 1, further comprising a leash-receiving ring secured to the saddle.

5. The umbrella of claim 1, wherein the pivot pin traverses the second end of the shaft and engages the saddle, securing the shaft pivotally to the saddle.

6. The umbrella of claim 5, which further comprises:
   a plate secured to the saddle; and
   first and second mutually substantially parallel planar members secured substantially perpendicular to the plate,
   wherein the pivot pin traverses the first planar member, a first hole in the second end of the shaft, and the second planar member.

7. The umbrella of claim 5, wherein the pivot pin releasably engages the saddle, permitting the shaft to be released from the saddle when the pivot pin is disengaged.

8. The umbrella of claim 7, wherein the pivot pin is resilient.

9. The umbrella of claim 1, wherein the position lock comprises a locking pin for releasably securing the shaft in the substantially vertical position relative to the saddle such that the locking pin traverses the second end of the shaft when the shaft is in the substantially vertical position relative to the saddle.

10. The umbrella of claim 9, which further comprises:
a plate secured to the saddle; and
first and second mutually substantially parallel planar members secured substantially perpendicularly to the plate
wherein the locking pin traverses the first planar member, a second hole in the second end of the shaft, and the second planar member, and wherein the locking pin releasably engages the first and second planar members such that when the first and second planar members and the shaft are engaged by the locking pin, the shaft is maintained in a substantially vertical position relative to the saddle, and when the locking pin is disengaged from the first and second planar members and the shaft, the shaft is pivoted about the pivot point to a substantially horizontal position relative to the saddle.

11. The umbrella of claim 1, wherein the position lock comprises a tube which encircles the second end of the shaft and the pivot to secure the shaft in the substantially vertical position relative to the saddle.

12. The umbrella of claim 1, which further comprises:
a plate secure to the saddle; and
first and second mutually substantially parallel planar members secured substantially perpendicularly to the plate
wherein the pivot comprises a pivot pin that traverses the first planar member, a first hole in the second end of the shaft, and me second planar member to secure the shaft to the saddle, and
wherein the position lock is a locking pin that traverses the first planar member, a second hole in the second end of the shaft, and the second planar member, the locking pin releasably engaging the first and second planar members such that when the first and second planar members are engaged by the locking pin, the shaft is maintained in a substantially vertical position relative to the saddle, and when the second pin is disengaged from the first and second planar members, the shaft is pivoted about the pivot point to a substantially horizontal position relative to the saddle.

* * * * *